United States Patent [19]

Pate et al.

[11] Patent Number: 4,885,706

[45] Date of Patent: Dec. 5, 1989

[54] COMPUTER AIDED FLOOD CONTROL MODELING AND MANAGEMENT SYSTEM

[75] Inventors: Gerry E. Pate; Ronald L. Mullinax, both of Houston; Alexander G. Sutton, Kingwood; Jeff E. Ross, Houston, all of Tex.

[73] Assignee: Pate Systems, Inc., Houston, Tex.

[21] Appl. No.: 151,891

[22] Filed: Feb. 3, 1988

[51] Int. Cl.$^4$ .................... G06F 15/36; G06F 15/56
[52] U.S. Cl. ............................ 364/551.01; 364/578
[58] Field of Search ............ 364/200, 578, 900, 551.01

[56] References Cited

U.S. PATENT DOCUMENTS

| | | | |
|---|---|---|---|
| 4,210,964 | 7/1980 | Rogers et al. | 364/578 |
| 4,512,747 | 4/1985 | Hitchens et al. | 364/578 X |
| 4,555,756 | 11/1985 | Yamanaka | 364/578 X |
| 4,604,718 | 8/1986 | Norman et al. | 364/578 |
| 4,613,952 | 9/1986 | McClanahan | 364/578 |
| 4,679,174 | 7/1987 | Gelfand | 364/578 X |

Primary Examiner—Felix D. Gruber
Attorney, Agent, or Firm—Pravel, Gambrell, Hewitt, Kimball & Krieger

[57] ABSTRACT

The present invention is used in the management of flood control systems. A database representing a plurality of watersheds and associated control systems, including monitoring and control systems, is used to simulate the effect of existing and proposed developments on the selected watershed. The effects of these analyses may be displayed either as text or graphically. By using a single database, the system may be used to manage the cumulative effect of multiple analyses and maintain the currency of proposed developments. The system includes a design module which permits the operator to interactively modify watershed parameters used in the analysis, thereby modeling proposed changes in the flood control system.

15 Claims, 4 Drawing Sheets

COMPUTER AIDED FLOOD CONTROL MODELING AND MANAGEMENT SYSTEM

BACKGROUND OF THE INVENTION

1. Field of Invention

The present invention relates to computer modeling and simulating systems, in particular, to a computer system for modeling and analyzing the effect of existing and proposed development upon flood control systems.

2. General Background

The use of computerized systems in simulation, modeling and analysis has long been known. Mechanical and electrical systems have been modeled using a set of computer instructions which have been used to describe the system to varying degrees. Conditions and events, for example, operating ranges and signal levels, flows, frequencies and timing, have been used as variable or fixed conditions in modeling systems. The modeling or simulation system has been used to then attempt to describe how the system would react to changes in status conditions and events.

The advantages of using computerized simulation systems are well known. The time and cost associated with mathematically modeling systems has been shown to be generally less than that required to build a working prototype or model. The system or modeling parameters can be readily changed to reflect changes in design or the working environment. The model may be used to artificially test the system's response to a range of different conditions that might not be easily replicated using real world systems. Lastly, model simulation has permitted comparative evaluation of different system embodiments without the expense and time of building physical prototype systems. Computerized simulation systems have been utilized in a number of different areas. The following prior United States patents are typical of such prior simulation and modeling techniques.

U.S. Pat. No. 4,604,718 disclosed a system designed to simulate an automated storage and retrieval system. The user interactively described facility equipment and operations. The simulation system then created the necessary program statements to reflect the environment and operations, the results of which were displayed either as text or graphically. U.S. Pat. No. 4,512,747 also disclosed a system designed to simulate operation of an automated material handling system. The user interactively described the material handling equipment and events, and the simulation results were displayed as text or graphically.

U.S. Pat. No. 4,613,952 disclosed a computerized system designed to act as a training simulator for a multistage industrial plant. The simulator hardware and software was customized to reflect individual installations. The purpose of this system was to train plant operators without utilizing plant facilities.

Each of the above computerized systems were designed to simulate operations of a physical system without the necessity of a physical prototype. Other prior simulation models have been designed for use with existing systems.

For example, U.S. Pat. No. 4,555,756 disclosed a simulation system designed to share data channels with the plant facilities the model was designed to simulate. Using remote terminals, steel mill operations were simulated and optimized without the necessity of running the mill equipment.

With regard to the specific application of flood water level prediction and control, in the past flood control districts or municipal agencies have attempted to establish data bases reflecting current developments, approved developments and data concerning the existing flood control system. Typically this data has been provided by the agency to developers or engineers who then were required to manually update the data to include the proposed development changes and to analytically derive solutions indicative of the effect of the proposed development on the flood levels using public domain software known as HEC-1 and HEC-2. One of the primary problems associated with the prior practice was that the data base used for modeling was being independently modified by other parties representing other interests before an individual development analysis was approved. This resulted in a lack of coordination between the proposed projects with no accounting for the interactive effects the developments would have on the entire system as well as a loss of integrity of the system data base. The prior method of flood control simulation and modeling involved a great deal of manual data input and analysis even though some portions of the method were automated. Typically, a developer or engineering firm would require two to three months to complete the analysis and proposal. Because of the time delay necessitated, the proposal could not include or account for interactive effects which would result from changes to the systems by the municipality or by other developers not included in the data utilized by the Applicants. This existing system of analysis is very time consuming. Additionally, the multiple analyses ongoing at any point in time make management of the flood control system very difficult, if not impossible.

SUMMARY OF THE INVENTION

The present invention specifically addresses three key issues in the administration of flood control programs. The invention provides a singular database for each drainage system which can be effectively managed, administrative control over all ongoing analyses, and an analysis response in a timely manner.

The present invention is directed toward the simulation of flood control management systems, including monitoring and control elements thereof. Simulation of flood control systems is a necessity due to the cost, time and regulatory restraints involved in determining the effects of urban or industrial developments on existing flood control systems. Modeling development or system changes is particularly advantageous as it permits engineers to perform "what if" iterative analysis as part of a capital budgeting process. The present invention is designed to permit an engineer to analyze the effect of urban or industrial development upon a watershed and develop the necessary studies required for governmental flood control approval. Further, the present invention may be used to interactively customize input files for later analysis using programs, such as HEC-1 and HEC-2. The ability to perform the above analysis using this computer aided technique decreases the time and cost involved in obtaining flood control approval dramatically. The ability to quickly update data files and analyze the proposed developments' effect on the flood control system allows the agency to maintain the data base current and to perform the analysis on the same day thereby improving the accuracy of the analysis and the integrity of the data base. Further, the ability to interactively customize flood control analysis decreases the time and cost involved in making comparative decisions in designing new or modifying existing flood control systems. This feature permits the agency to include confirmed but yet incomplete system improvements in the analysis and therefore perhaps issue permits allowing development after system improvements are to be completed, or to make the permit conditional upon the installation or upgrading of the flood control system. These features greatly enhance the effectiveness and efficiency of the flood control agency.

In one presently preferred embodiment of the invention, the computer aided management system includes a central processing unit (CPU) interconnected to a digitizing unit. Watershed information including flood control channels (natural and man-made), existing developments and other information is transferred from paper maps to an electronically stored watershed data file, by means of the digitizing tablet connected to the CPU.

The analysis process begins with describing the proposed development in the watershed data files. The proposed development is identified to the system by digitizing an overlay of the property involved, or by inputting the watershed map coordinates of the property. The area of the proposed development is automatically calculated by the system. At this point, the user customizes certain parameters to be used in the analysis, such as TC&R (time of concentration and storage coefficient) to be used in the analysis. However, these factors are generally determined previously and need not be entered during the analysis phase of the system. The present system then coordinates the use of this data by analytical instruction sets on subprograms which cause the CPU to calculate flood flows and resulting water surface information to determine the effect of the proposed developments on the watershed. The information is displayed in either a tabular or graphic format.

At the same time, the system of the present invention maintains a database associated with the watershed data file which includes existing and all other proposed developments i.e. those proposed by other developers and permitted even though not completed and their cumulative effect upon flood control systems. This module also has the ability to "age" proposed development impacts, removing them from the analysis after a set period of time.

The system of the present invention also has the ability to interactively modify parameters, including rainfall levels and concentration, and flood control system description. The latter permits engineers to evaluate the effect of flood control improvements or additions on watershed flood levels. The present invention permits the user to customize and store these parameters for iterative evaluation while maintaining baseline data. The design information may then be passed to the analysis module which calculates flood control system flows and resulting water surface information as previously described.

The present invention thus greatly decreases the time required to perform analysis required for regulatory approval of developments. Further, it may be used to model changes to existing flood control systems. This latter ability greatly enhances the ability of flood control districts to plan necessary capital improvements.

DETAILED DESCRIPTION OF DRAWINGS

Figure 1:
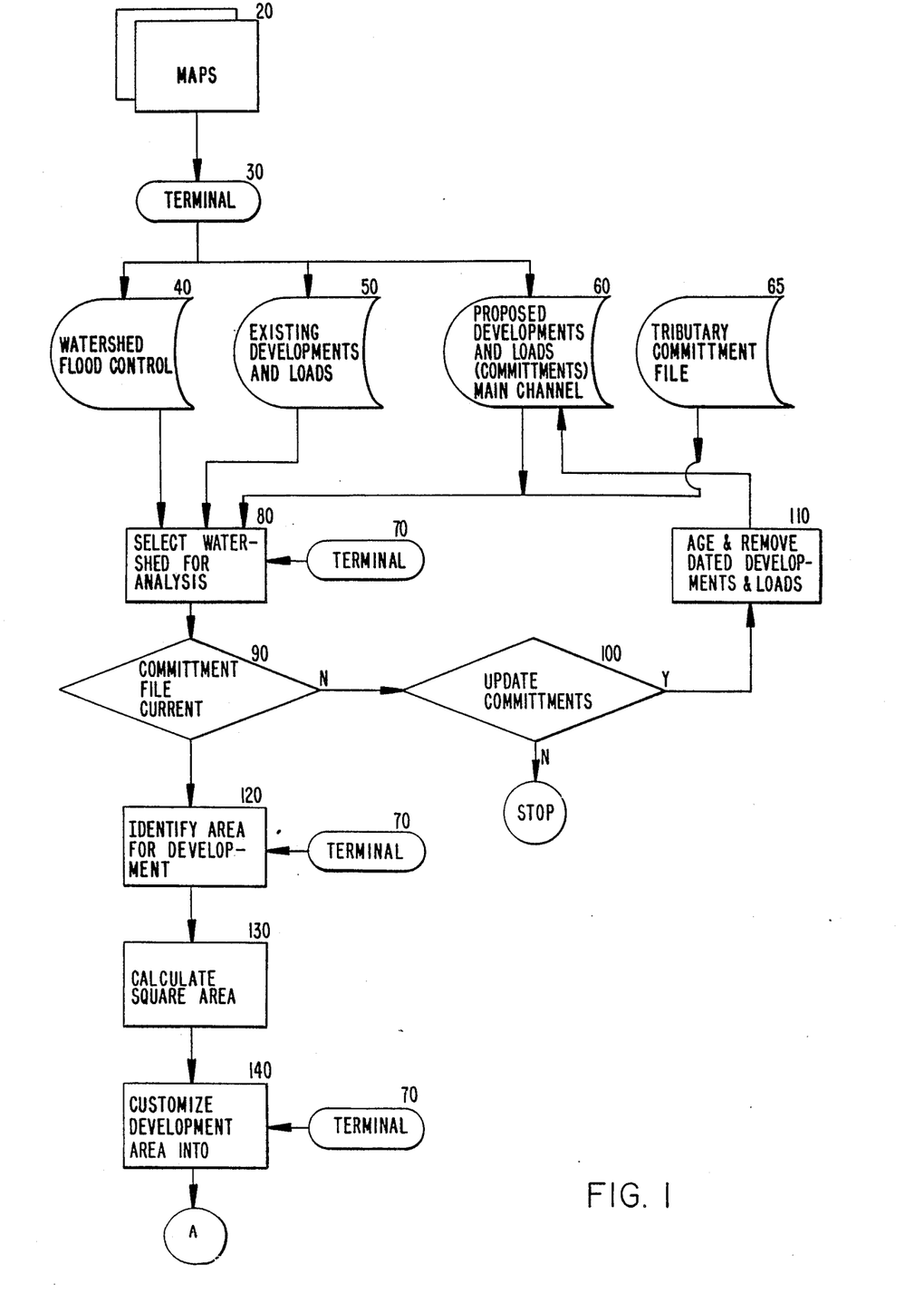
FIGS. 1-4 comprise a flow chart which generally illustrates the operation of the present invention.
Figure 2:
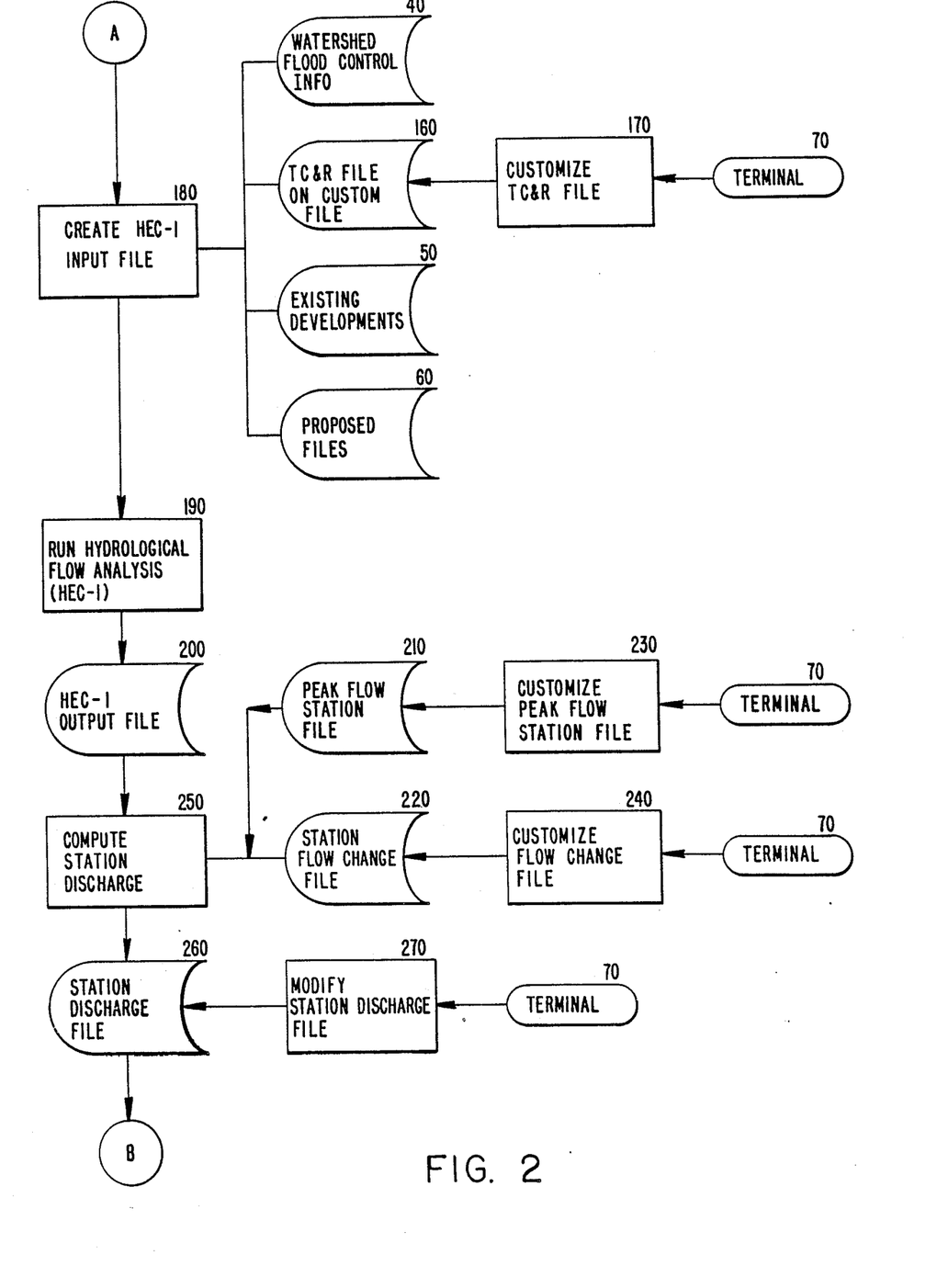
Figure 3:
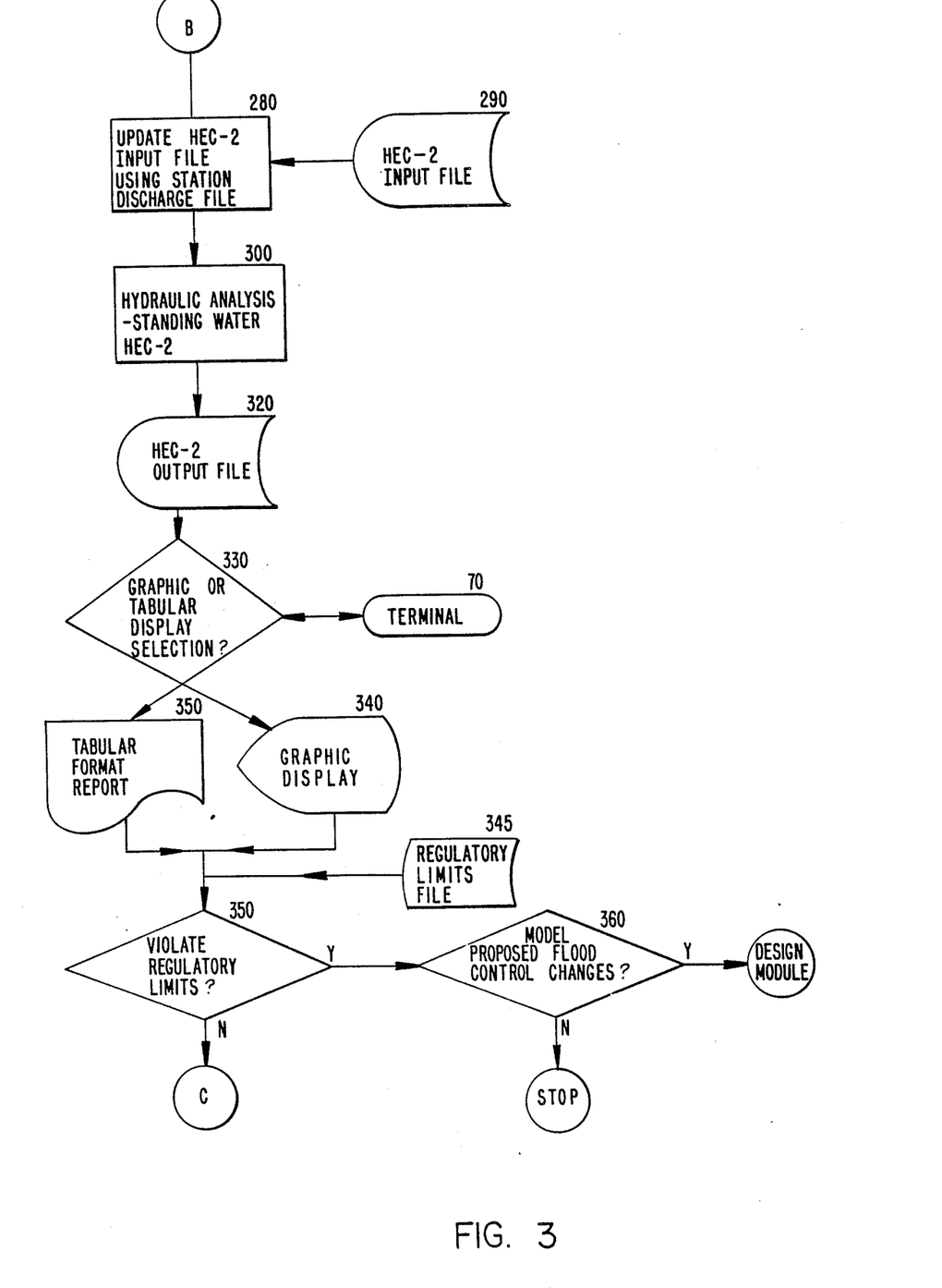
Figure 4:
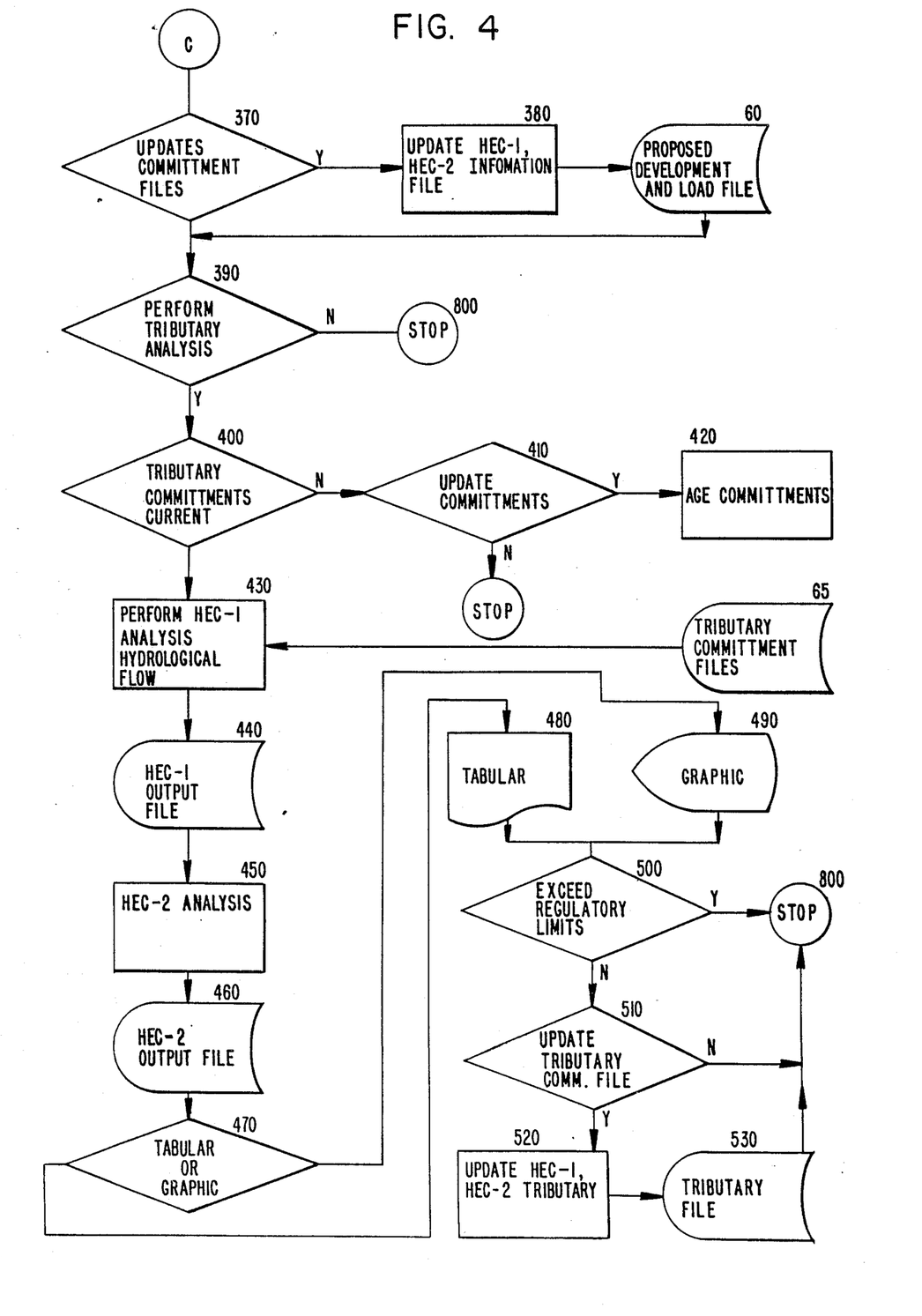

FIGS 1-4 comprise a flow chart showing operation of the present invention. For ease of presentation, the schematic depicts processing in a linear flow. It should be noted that the master control module (not shown) permits any step to be iteratively performed prior to continuing.

The system 10 operation begins with the capture of specific information regarding the watershed. Some of the information is captured from maps 20 which are digitized using a graphics terminal 70 to create a watershed flood control file 40. Other information within the system includes data on existing developments and their associated loads upon associated flood control systems 50; proposed developments and their associated loads 60; and tributary loading associated with both existing and proposed developments 65. Much of this information has already been prepared and is available through the local flood control authority or the Federal Emergency Management Agency. Further reference to system operation will be in terms of analysis versus design aspects of the system. The analysis portion is one in which all parameters have been determined and operations proceed with minimum intervention. The design phase of operation permits the user to interactively modify parameters or perform iterative operations during the analysis phase in order to perform comparative analysis.

Analysis begins at step 80 which permits the operator to select the pertinent watershed through use of a graphics terminal 70. Control is then transferred to step 90 which causes the CPU to determine if any of the proposed development commitments are expired. One embodiment allows a proposed development to be added to the commitment file 60 for a period of 30 days without requiring payment of the development or permit fee. If the developer has not paid the necessary fees within the 30 day period, the proposed development and its associated loading is considered expired and is deleted from the data file via steps 100 and 110. Once the commitment file is updated, control of the CPU returns through steps 80 and 90 to step 120. It will be appreciated that the 30 day period is arbitrary and this system parameter may be set for any other desired period. If a commitment has expired, the operator is prompted by the CPU to determine if the commitment database is to be updated at step 100. If the user chooses to update, an instruction set 110 ages the commitments, removes any which are expired then writes the changes to the proposed database 60.

At step 120, the CPU provides a prompt to the operator requesting the identity of the acreage involved in the proposed development. In the preferred embodiment, the operator is permitted to identify the area by graphically describing the land boundaries using graphics terminal 70, or by manually entering the map coordinates which describe the boundaries to the graphics system. Graphics terminal 70 may include a digitizing tablet and mouse used by the operator to trace the outline of the proposed development area on an appropriate flood control map. Control is then transferred to step 130 which causes the CPU to calculate the acreage involved in the proposed development based upon the described boundaries. Control of the CPU is then transferred to step 140 which provides prompt to determine whether the operator wishes to enter the design phase of the system to modify or customize any of the development acreage using terminal 70. Any such customization or modification by the operator is entered and control is transferred to step 180 which begins the analytical phase.

The analytical portion of the system begins at step 180 which causes the CPU to read the acreage file 140; watershed flood control file 40; existing development file 50, proposed commitments file 60; and a TC&R (time of concentration and storage coefficient) file 160. In most cases, the TC&R file includes data based upon 100 year flood water projections. However, the system permits the operator to enter the design module at step 170 to customize the TC&R file via graphics terminal 70 to describe a specific set of conditions not included in the 100 year flood data. Step 180 includes a set of instructions which causes the CPU to read all of the above files and prepare an input file which is suitable for use with public domain analytical instruction set known as HEC-1. HEC-1 is a hydrological simulation program developed by the Corps of Engineers and in the public domain. Control of the CPU is transferred to step 190 which accesses and executes the HEC-1 instruction set which causes the CPU to calculate hydrological flows or flood water flows, with respect to the main channels of the flood control system. Control is then transferred to step 200 which causes the CPU to create an HEC-1 output file for storing the results of the previous calculation.

Control of the CPU is then transferred to step 250 which includes a set of instructions which causes the CPU to calculate flood station discharge rates. Each flood station represents a discrete point in the flow path of a flood control system and often represent remote monitoring stations in a flood control system. These points are generally intersections with bridges or confluences of drainage channels. The instruction set executed at step 250 causes the CPU to read the HEC-1 output file derived at step 200. Thereafter, the system provides the operator the opportunity to customize two other data files used in the analysis. Step 250 causes the CPU to read the peak flow station data file 210 and a station flow file 220. If the operator has opted to customize these files, control of the CPU is transferred to allow such customizing at steps 230 and 240 respectively before data files 210 and 220 are read. The peak flow file 210 and flow change file 220 may be modified interactively by the user upon entering the design module via terminal 70. This may be done to evaluate the effects on the flood control system which would result from proposed changes or improvements. Once these standard or modified data files are read, instruction set 250 causes the CPU to calculate the rate of discharge for each of the flow stations along the flood control channels, and store this data in a station discharge file 260. Control is then transferred to step 270 which permits the operator to interactively modify the discharge data by entering the design module via terminal 70. Once the calculated station discharge data or modified data are stored in date file 260, control of the CPU is transferred to step 280.

Step 280 causes the CPU to update an existing HEC-2 input file 290 which describes the existing water surface profile. Step 280 causes the CPU to compare the station discharge data in file 260 which represents the system parameters calculated in the previous sequences reflecting the proposed development and/or system modifications to an existing data file 290 which includes data formatted for use in a public domain hydraulic analysis program known as HEC-2. Once file 290 has been updated, control is transferred to step 300 which causes the CPU to access and execute the HEC-2 analytical instruction set. The updated file 290 is used as an input file for HEC-2 calculations 300.

HEC-2 is a public domain program created by the Army Corps of Engineers which is used to perform hydraulic analysis and determine the water surface profile on the watershed, with reference to specific station discharge points. Step 300 includes instructions which cause the CPU to create an HEC-2 output file 310 which describes the depth of water at these specific discharge points. Control is then transferred to step 320 which permits the operator via a suitable prompt to select via terminal 70 an output format with the results being printed in a tabular form at step 330 or displayed graphically at step 340.

Control of the CPU is then transferred to step 350 which includes instructions which cause the CPU to compare the data in file 310 to the applicable regulatory limits data stored in data file 345. Where the water profile is in excess of regulatory limits, the instruction set 350 causes the CPU to provide the operator an appropriate indication of the excess(es). Where excesses are indicated, the system warns the operator that if the proposed development is permitted, an increase in water surface will occur at the identified point(s) in the channel. The operator then is provided the option at step 360 of entering the design module to modify different parameters in the analysis, e.g., flood control file 40, station peak flow file 210, etc., to model proposed changes in the system that might alleviate the indicated increased water surface conditions. To proceed, the operator performs the analysis again using the modified system parameters to determine if the modifications eliminate the increased water surface condition. Should the operator decide not to modify any of the parameters, system execution terminates at step 800.

If at step 350 it is determined that the water surface profile does not violate regulatory limits, control is transferred to step 370 where the CPU permits the operator to elect to update the commitment file which includes committed developments. If the operator so elects, control is transferred to step 380 which causes the CPU to write the new data which reflects the proposed development to the proposed commitments file 60. Control is then transferred to step 390 which provides the operator the option of performing a tributary analysis which provides an analysis of the effects of the proposed developments on the tributary elements of the flood control system in addition to the main channel analysis provided in the previously described steps. If the operator declines, system operations terminate at step 800.

Tributary analysis begins at step 400 which causes the CPU to determine if any of the tributary commitments are expired. If there are expired commitments, the operator is prompted at step 410 to determine whether the tributary commitment file is to be aged and purged 420, with the results being re-written to tributary commitment file 65. Control of the CPU is then transferred to step 430.

Step 430 causes the CPU to perform an HEC-1 flow analysis with respect to the tributaries, creating an HEC-1 tributary output file at step 440. The CPU then reads the tributary output file and utilizes it as input data in the HEC-2 hydraulic analysis at step 450 to calculate the tributary water surface profile. The resulting data is written into an output file at step 460. As earlier, when control is transferred to step 470, the operator, via terminal 70, is given the option on selecting the format in which the results are to be displayed as either or both tabular printed 480 or graphic display 490. Control is then transferred to step 500 which causes the CPU to determine whether the results exceed the tributary regulatory limits. The system will warn the operator if the regulatory limits are exceeded. The operator may again enter the design module to modify analysis parameters, thereby modeling proposed changes in the system which may alleviate the increased water surface along the tributaries. If the operator declines to enter the design module when an excess condition occurs, control transfers to step 800 where execution stops. If within acceptable limits, control is transferred to step 510 where the CPU prompts the operator to determine if the tributary commitment file is to be updated. If the operator declines, control is transferred to step 800 where system execution stops. If the operator decides to update and record the new commitments, control is transferred to step 520 which causes the CPU to write the updated HEC-1 and HEC-2 tributary data into to the tributary file 65. System execution then stops at step 800.

We claim:

1. A method for evaluating the effect of proposed developments or system modifications upon a flood control system, the steps of which comprise:

(a) establishing a system watershed data base including data representing a plurality of watersheds and associated parameters, said parameters including data relating to hydrological and hydraulic characteristics of primary and secondary water channels, location and surface acreage of existing developments, expected rainfall levels, and terrain data associated with said watersheds;

(b) identifying the watershed within which the proposed development or system modification is located;

(c) developing data representative of the boundaries of the proposed development or modification;

(d) calculating the hydrological parameters associated with the proposed land development or system modification within the selected watershed;

(e) reviewing a data file including data representative of the status of previously approved developments or modifications within the selected watershed to determine whether such previously approved developments or modifications are current;

(f) determining the hydrological parameters associated with the portion of the flood control system comprising the existing, currently approved and proposed land developments or modifications within the selected watershed;

(g) modifying the watershed data base to include data representative of the hydrological parameters of the proposed and previously approved and current new developments;

(h) determining modified hydrological flow rates for main and secondary channels within the selected watershed utilizing the modified watershed data base;

(i) determining modified flows for a plurality of stations or locations located along the main water channels within the selected watershed;

(j) establishing a modified hydraulic analysis input data base including data representative of the hydrological and hydraulic parameters of the portion of the flood control system comprising the existing watershed, the approved developments and the proposed development or modifications;

(k) determining the effects of the proposed development or modification upon the selected watershed and associated flood control system utilizing the data within the modified hydraulic analysis input data file, including a determination of the water surface profile for stations or locations along the primary water channel within the selected watershed;

(l) comparing the effects of the proposed development or modification with prescribed minimum or maximum parameters to determine if the effects of the proposed development or modification cause the watershed parameters to satisfy the prescribed minimums or maximums.

2. The method of claim 1, further comprising the step of providing a graphic display of the effects of the proposed new development or modification on flood levels.

3. The method of claim 2 wherein the display includes an indication of which, if any, of the resulting effects fail to satisfy the prescribed minimums or maximums.

4. The method of claim 1, further comprising the step of selectively updating the selected watershed parameters to include those parameters attributable to the proposed development, where the proposed development satisfies regulatory agency requirements.

5. The method of claim 1, further including steps to evaluate the effects of said newly proposed land development upon said secondary water channels located within said selected watershed, said additional steps comprising:

(a) selecting the secondary water channels within the watershed to be analyzed;

(b) revising the modified hydrological analysis output data file to include parameters associated with the selected secondary water channels;

(c) determining flows for a plurality of stations or locations along the selected secondary water channels within the selected watershed, and modifying the station discharge file;

(d) modifying the hydraulic analysis input data file to reflect information within said updated hydrological output data file and said updated station discharge flow file;

(e) modifying the effects upon the selected watershed based upon information within the modified hydraulic analysis input data file, thereby calculating a water surface profile for points along the selected secondary water channels within the selected watershed; and (f) comparing the effects of the proposed development with predetermined regulatory agency acceptable water surface profile data, thereby determining if the selected secondary water channels' water surface profile exceeds levels set by the regulatory agency for a plurality of corresponding stations or locations along the selected secondary water channels.

6. The method of claim 5, further comprising the step of selectively updating the selected secondary water channel parameters within the selected watershed to include parameters attributable to the proposed development, where the proposed development satisfies regulatory agency requirements.

7. The method of claim 1, further including the additional steps of:
   (a) selectively, interactively modifying data within any of the input, output, work or data files and databases used or created in the analysis process;
   (b) using interactively modified files and databases for further use in the analysis process; and
   (c) maintaining a copy of said input, output, work or data files and databases which do not reflect said interactive modifications.

8. The method of analysis of claim 3, further including executing discrete steps of the method on an iterative basis to model the effect of alternative scenarios in the analysis process prior to proceeding to the next step in the analysis.

9. The method of claim 1, wherein the step of describing the boundaries of the proposed development includes graphically identifying the boundaries.

10. The method of claim 1, wherein the step of describing the boundaries of proposed development includes reading a boundary file containing records describing the boundaries.

11. The method of claim 1, wherein the step of reviewing and aging previously approved developments includes:
   (a) serially reading a record from an approved development commitment file, the record including watershed parameters associated with the approved development, including the date on which the record was added to the commitment file;
   (b) determining if the record status indicates that the development commitment is in compliance with said regulatory agency requirements for maintaining the development and its associated record in the proposed commitment file;
   (c) updating the record status to indicate that said development is in compliance where regulatory agency requirements have been met;
   (d) where said record status indicates the development is not in compliance, comparing the elapsed time since development was added to development commitment file to an elapsed time period set by said regulatory agency;
   (e) where record status indicates that the development is not in compliance, generating a printed message for administrative purposes indicating the development is non-current, having approached or exceeded the time period set for complying with the regulatory agency requirements;
   (f) deleting the non-current records from the development commitment file, thereby permitting the method to continue; and
   (g) repeating said steps (a) through (e) until all records within the development commitment file have been reviewed;
   (h) halting execution of the method where any of the records within the development commitment file indicate that a record and its associated development are non-current;
   (i) writing the exception file to printed media for administrative purposes.

12. The method of claim 1, wherein the step of modifying the watershed data base to include hydrological parameters of the proposed and previously approved developments further comprises the steps of:
   (a) determining if secondary water channels are to be included in the analysis;
   (b) reading a data file representing parameters associated with the proposed development and verifying that the proposed development exists within the selected watershed;
   (c) serially reading records in a development commitment file, including associated acreage parameters, accumulating the acreage parameters associated with the proposed development and a preexisting base acreage file, representative of existing developments and terrain data within the watershed and writing the records to a work file;
   (d) where secondary water channels have been selected to be included in the analysis, serially reading a record in a secondary water channel data file, including associated acreage parameters, accumulating to the total already calculated in said step (c) and writing the records to the work file, repeating steps (c) and (d) until all records in the development commitment and selected secondary water channel data files have been read, accumulated and written to the work file;
   (e) printing the results of contents of said work file to indicate the total acreage designated to be included in the analysis;
   (f) serially reading a record in the work file, calculating hydrological runoff parameters for the specific acreage represented by the record and writing the results of the calculations back to the record, repeating said step until runoff parameters for all records in the work file have been calculated; and
   (g) serially reading a preexisting hydrological analysis input data file, determining corresponding records in the generic file and the work file and modifying the generic hydrological analysis input data file to include calculated hydrological runoff parameters from the work file, thereby creating the modified hydrological analysis input data file.

13. The method of claim 1, wherein the step of calculating station discharge flow further comprises the steps of:
   (a) serially reading a record in a primary watershed channel data file;
   (b) serially reading records from the hydrological analysis output data file, selecting those records associated with hydrological stations or locations along the primary and secondary water channels and writing the selected records to a station peak flow file;
   (c) serially reading records in a preexisting hydraulic analysis base file and corresponding records in the station peak flow file, interpolating hydraulic analysis flows, and calculating the total discharge flows for said stations or locations; and
   (d) writing results of the calculations to a station discharge file.

14. The method of claim 1, wherein the step of modifying a preexisting hydraulic analysis input data comprises the steps of:
   (a) serially reading a record in a station discharge file, including information concerning both hydrological output flows and interpolated hydraulic analysis flows for the primary and secondary channels affected;

(b) serially reading a record in a preexisting hydraulic analysis input data file and modifying corresponding records in the preexisting file to include calculated flow data from the station discharge file.

15. The method of claim 1, wherein the step of comparing the hydraulic analysis effects with minimum or maximum parameters further comprises the steps of:

(a) serially reading a record in the hydraulic analysis output file;
(b) calculating a water surface profile for various stations or locations along the selected primary and secondary water channels;
(c) comparing the water surface profile record to a corresponding record in a preexisting regulatory agency water surface profile file; and
(d) writing the results of the comparison to a comparison output file, including information identifying the location or point in the analysis.

* * * * *